I. R. SMITH.
Wheel Cultivator.
No. 3,932. Reissued April 26, 1870.
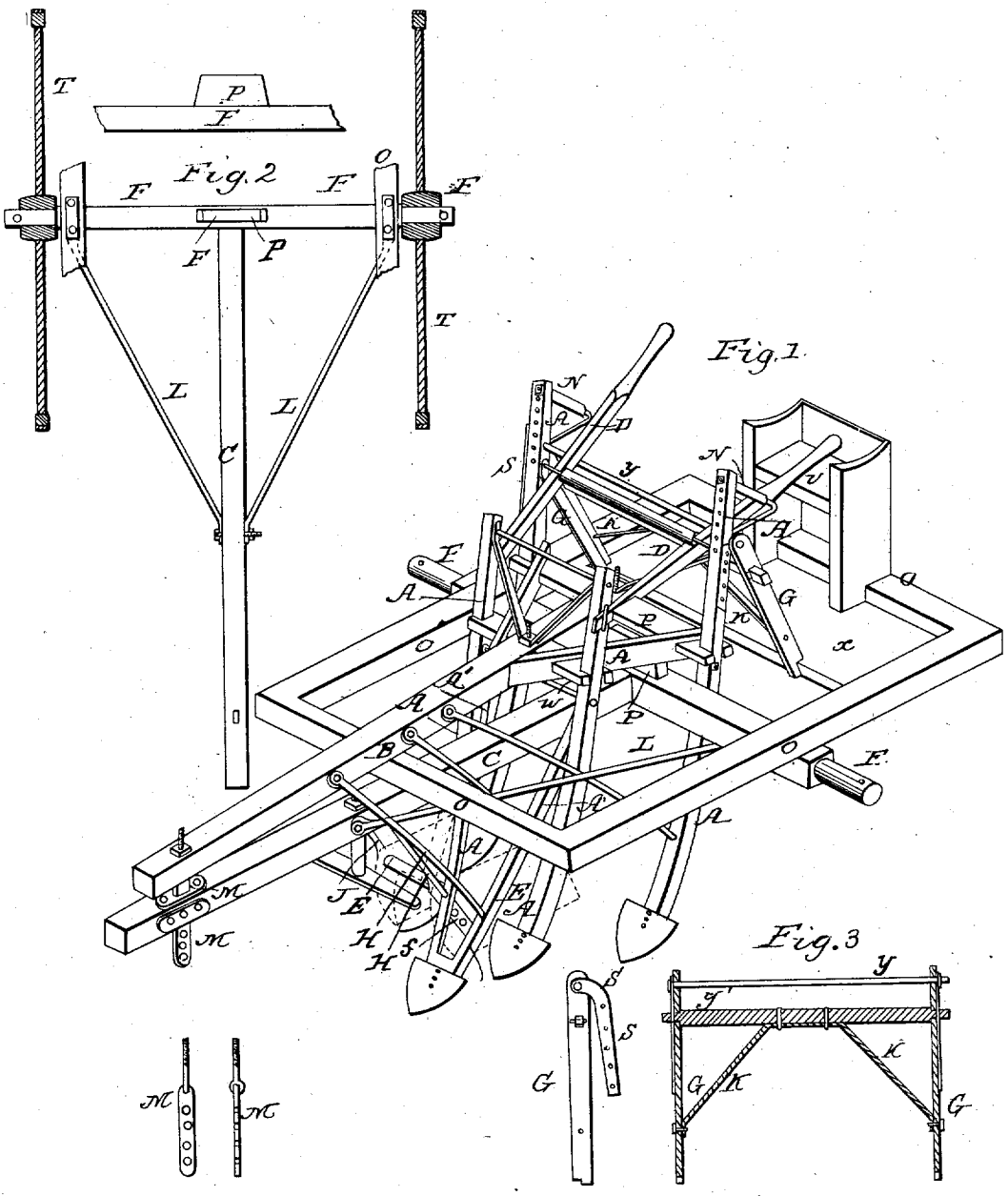
WITNESSES
John S. Ridale
Wm G. Hubbell
INVENTOR
Irulus R. Smith
N. PETERS, Photo-Lithographer, Washington, D. C.

UNITED STATES PATENT OFFICE.

JULIUS GERBER, OF ROCKFORD, ILLINOIS, ASSIGNEE OF IRULUS R. SMITH.

IMPROVEMENT IN CULTIVATORS.

Specification forming part of Letters Patent No. 28,016, dated April 24, 1860; Reissue No. 3,932, dated April 26, 1870.

*To all whom it may concern:*

Be it known that IRULUS R. SMITH, of Elgin, in the county of Cook and State of Illinois, did invent a new and useful Improvement in Cultivators; and it is hereby declared that the following is a full and exact description of the same, reference being had to the accompanying drawings, and to the letters of reference marked thereon.

This invention relates to that class of cultivators which employ, in connection with the main frame supported upon wheels, an auxiliary frame carrying the standards and shovels; and it consists, first, in hinging the auxiliary frame to the tongue between the evener and the neck-yoke to increase the length of beam and obtain more purchase in the side motion; and, second, in the general construction and arrangement of the parts of the machine as a whole.

In the drawings, Figure 1 represents a perspective view of said improved cultivator, and Figs. 2 and 3, views of parts detached.

To enable others skilled in the art to make and use the invention, its construction and method of operation will now be fully described.

A main frame is provided, consisting essentially of the tongue, axle, and timbers O, which is supported by carrying-wheels in the usual manner. An auxiliary frame is also provided, to which the shovels are attached by means of standards in any suitable manner. This auxiliary frame is hinged or otherwise loosely attached to the main frame at a point between the evener and neck-yoke, by means of which great length of beam is obtained, and also more purchase in the side motion.

The specific construction of the parts is as follows:

C represents the tongue, which is connected to the axle at about its center. Upon these beams are laid the timbers O, upon one of which rests the seat V. These parts in combination form the main frame, which is supported by wheels in the usual manner.

B represents the main beam of the auxiliary frame, which is loosely united to the tongue C forward of the evener *c* by means of the joint *m*, the specific construction of which latter is clearly shown in the drawings. The beam B is provided with a cross-bar and angle-beams, which together constitute the auxiliary frame proper, to which the shovel-standards are attached.

A A represent the standards, which are secured in any proper manner to the frame, and are also held by braces, as shown.

A′ represents a standard having a shovel attached, which is made detachable in order that it may be readily removed when desired.

*e e* represent cheek-pieces, which are held by adjustable rods, which are also so constructed as to be easily removed when desired.

For the purpose of guiding the auxiliary frame, handles D and N are provided, the former being adapted for use when the operator is sitting and the latter when standing. The latter are made adjustable in their standards for the purpose of suiting persons of different heights.

For the purpose of holding the shovels out of the ground when desired, a truss, G, is provided, which rests upon the platform X when used for that purpose. This truss is held by arms *s*, which are also adjustable upon the standards.

It will be observed that the auxiliary frame and the main carrying-frame are entirely distinct and separate from each other, excepting that they are connected together by the joint M. The special advantage obtained by this construction is as follows: When two shovels are employed upon each side of the auxiliary frame the rear set are necessarily wider apart than the front set, and as they swing in the arc of a larger circle they move relatively over more ground. In the ordinary cultivator this difference of relative movement is quite marked, and consequently there is danger, when the front shovels are swung aside to avoid irregularly-planted hills, of the rear shovels interfering with the wheels on the adjacent rows. By means, however, of the long swing obtained by bringing the beam of the auxiliary frame forward of the evener the difference between the movements of the front and rear shovels is rendered relatively less and the difficulty referred to obviated.

The operation will be readily understood. The cheek-pieces are used to protect the crop from being injured by the dirt moved by the shovels. They are easily removed to permit the standard A′ to be attached when it is desired to use all the shovels. The easy but limited side motion of the auxiliary frame enables the driver to so control its action as to cultivate with safety those crops which have been irregularly planted, or which may have come up in other than straight lines.

Having thus fully described the invention, what is claimed as new, and desired to be secured by Letters Patent, is—

1. An auxiliary frame carrying two or more shovel-standards upon each side, as shown, when said frame is hinged to the pole between the evener and neck-yoke, as described, for the purpose set forth.

2. The combination of the main frame, consisting of the tongue, axle, and beam O, with the auxiliary frame consisting of the beam B, standards A, with its lifting devices, when the frames are made separate and distinct from each other and are connected only by the joint M. as described, for the purpose set forth.

This specification signed and witnessed this 22d day of March, 1870.

JULIUS GERBER.

Witnesses:
G. W. FORD,
CHARLIE S. FORD.